Nov. 26, 1957 W. J. COTTON 2,814,201
TEMPERATURE-TIME INTEGRATION SYSTEM
Original Filed Aug. 11, 1952 2 Sheets-Sheet 1
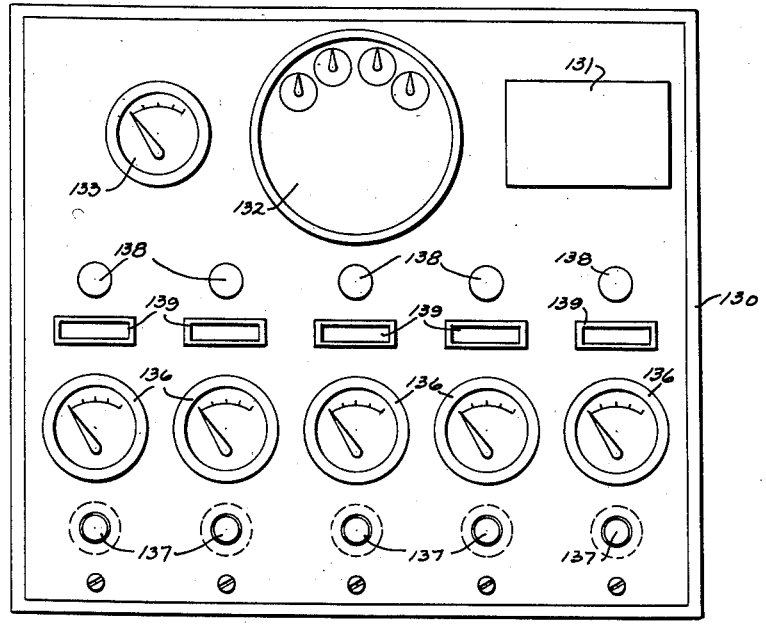
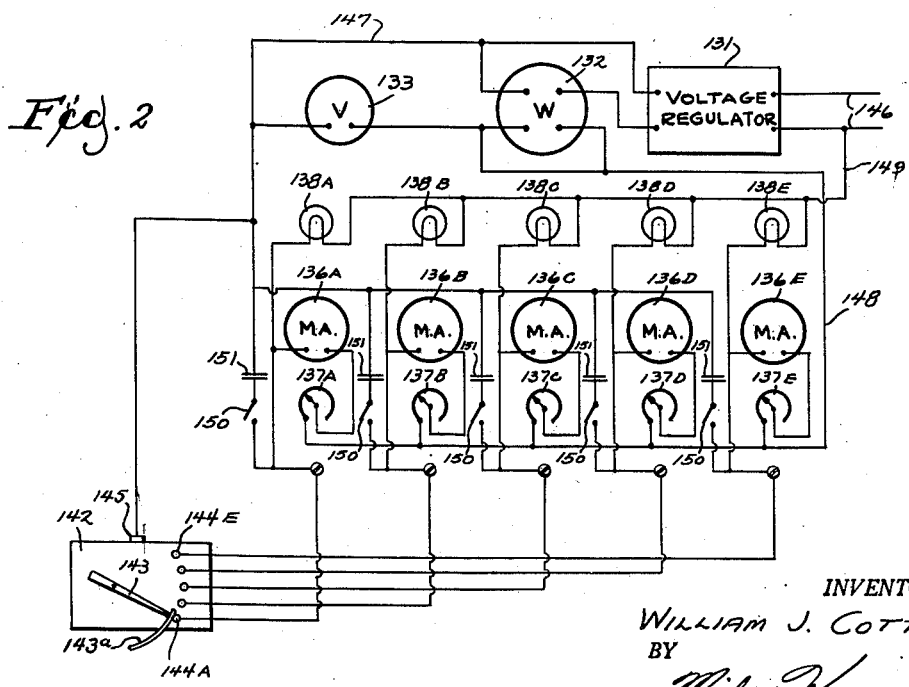
INVENTOR.
WILLIAM J. COTTON
BY
ATTORNEY Nov. 26, 1957 W. J. COTTON 2,814,201
TEMPERATURE-TIME INTEGRATION SYSTEM
Original Filed Aug. 11, 1952 2 Sheets-Sheet 2

INVENTOR.
WILLIAM J. COTTON
BY
*Miles Kerringer*
ATTORNEY

United States Patent Office 2,814,201
Patented Nov. 26, 1957

2,814,201

TEMPERATURE-TIME INTEGRATION SYSTEM

William J. Cotton, Milwaukee, Wis.

Original application August 11, 1952, Serial No. 303,779, now Patent No. 2,758,475, dated August 14, 1956. Divided and this application October 26, 1955, Serial No. 542,980

6 Claims. (Cl. 73—339)

This invention relates to the control of chemical processes by integrating the temperature and time thereof to produce optimum yield and uniform quality of the product by processing to exactly the desired degree and neither under-processing nor over-processing.

It is well known in normal plant operations, that actual operating temperatures deviate from standard processing temperatures, both above and below the set standard, for indefinite times during the process. From an operating standpoint such fluctuations are unavoidable even with the most skilful labor available. In most cases the aim is to produce the theoretical yield or maximum conversion of the raw materials or reactants into the finished product. However, in some cases standards have been established by usage in the trade so that the product desired by trade is either normally over-processed or under-processed as compared with the theoretically best processing.

This invention provides a substantially continuous automatic correction in processing time dependent on the fluctuating temperature of the particular batch, that is, correction in time of processing to offset deviations from normal, or ideal standard processing temperature. The correction is based on the extent and duration of temperature deviation, and utilizes the temperature coefficient of the rate of reaction, which factors are mechanically integrated as time-temperature units. The changes, deviations or fluctuations in the temperature of operation are recorded by a device indicating the accumulated time-temperature units (T–T units). An experimentally predetermined total of T–T units for each reaction is the endpoint of the reaction regardless of the time factor, if maximum yield and desired quality are to be obtained.

It is well known that increase in temperature generally increases the rate of reaction and sometimes, as is the case in most reactions carried out in aqueous media, the reaction rate in general doubles for each rise of approximately 10° C. In the case of caustic soda fusions, the rate of reaction may double with every 5° C. rise in temperature. In other words, temperatures below normal for a given reaction, result in decreasing the rate of reaction. Thus, a drop of 10° C. in the temperature at which an aqueous reaction is carried out will frequently result in reducing the rate of reaction by half, while caustic soda fusion reactions are quartered by a drop of 10° C. The change in rate of reaction with change in temperature at which the reaction is conducted, is defined as the temperature coefficient of the reaction. For the purposes of this invention, the temperature coefficient is measured in terms of degrees centigrade rise in temperature which will double the rate at which the reaction proceeds.

It is obvious that the greater the temperature coefficient, that is the fewer degrees temperature rise required to double the rate of reaction, the greater the importance of and the need for minimizing deviations of even a degree of temperature, or alternatively to correct the time of processing in accordance with this invention. It is also obvious that the greater the difficulty of controlling the temperature of the process as a result of varying steam pressure in a kettle jacket or varying pressure to the gas or oil burner under a kettle, the more important an immediate correction in processing time becomes.

The control equipment for application to any given reaction, while embodying the general principles of this invention, is easily adapted to any specific reaction to be performed. To adjust the constants of the control equipment to the reaction controlled, it is desirable but not essential that at least three and preferably all four, of the following conditions be experimentally determined in advance; namely, (a) The threshold temperature which is the temperature at which the reaction will begin and progress at a low rate such as 1% per hour;

(b) The temperature coefficient for the rate of reaction desired which is expressed in the number of degrees rise in temperature, in centigrade degrees, required to double the rate of reaction;

(c) A good normal or the ideal operating temperature permitting completion of the reaction of a batch to the desired extent in a convenient or practical length of time; and (d) The total number of energy units (time-temperature units) to be put into the batch for obtaining the desired degree of processing.

The present invention can be applied advantageously in many cases without previously determining any or all of the above data in connection with a specific reaction. Thus the control equipment can be applied to a batch operation in an existing process and the process run as usual for several batches, during which time the varying number of T–T units of energy supplied to the batch can be co-related to the yield and quality of the product. The desirable or the optimum number of energy T–T units utilized can be thus determined. Thereafter the control equipment can be set to indicate when the desired number of energy units have been supplied, by any appropriate means, such as a counter device, a light or bell, or other signal, or, all of them. The control equipment may operate a valve to turn off steam to the kettle jacket or gas or oil to the burner or to shut off electrical heating power.

In an electrically operated embodiment of the present invention, the control utilizes a number of ammeters which are connected through rheostats with the temperature indicating device. The ammeters successively become operative, each beginning at a given temperature, and the total electrical energy is integrated in the watt meter, with time, as watt-hours (T–T units). The status of a given reaction can thus be determined at any time and its approach to the endpoint of the reaction is continuously indicated.

It is therefore an object of the present invention to provide both time controlled equipment for and a method for adapting such equipment to any chemical reaction.

Another object of the invention is to provide equipment for controlling the duration of chemical reactions dependent on the heat involved, regardless of whether the reaction is endothermic or exothermic.

Another object of the invention is to provide a machine for automatically controlling the duration of a chemical reaction in which the temperature steps to be employed may be made uniform or of unequal values as desired.

Another object of the invention is to provide equipment for controlling chemical reactions in which the application of heat or the removal of heat may be automatically controlled and in which an indication is given both of the status of the reaction at any given time and of the time when the endpoint of the reaction is reached.

Another object of the invention is to provide a method for readily determining the settings of various elements of a control equipment used for controlling the duration of chemical reactions whereby the equipment may be readily adjusted and transferred from one reaction to another.

Another object of the invention is to provide equipment for readily determining the number of time-temperature (T–T) energy units required in processing any given material by the use of heat and determining the manner in which such units should be applied whereby the process may thereafter be controlled to optimum conditions with the minimum of labor or chance for error.

And a further object of the invention is to provide control equipment by which either a batch may be dumped or the reaction otherwise terminated when the predetermined number of energy units have been applied or an alarm may be operated to notify an operator that a reaction is to be terminated by means requiring the intervention of the operator.

Objects and advantages other than those above set forth, will be apparent from the following description when read in connection with the accompanying drawing in which:

Fig. 1 is a front elevation of an embodiment of the invention;

Fig. 2 is a circuit diagram for the present embodiment of the invention;

Referring to the drawing by numerals, like numerals refer to like parts with a letter A, B, C, D, E to designate like parts of a plurality of similar systems contained within the control.

Figs. 1 and 2 illustrate an electrically operated control which has the special advantages of being substantially explosion-proof, of having no moving parts except electric meters or similar indicators and which can be readily re-calibrated in a few minutes by any unskilled workman. The last mentioned advantage is of particular value where the installation is subject to considerable vibration.

Figure 3:
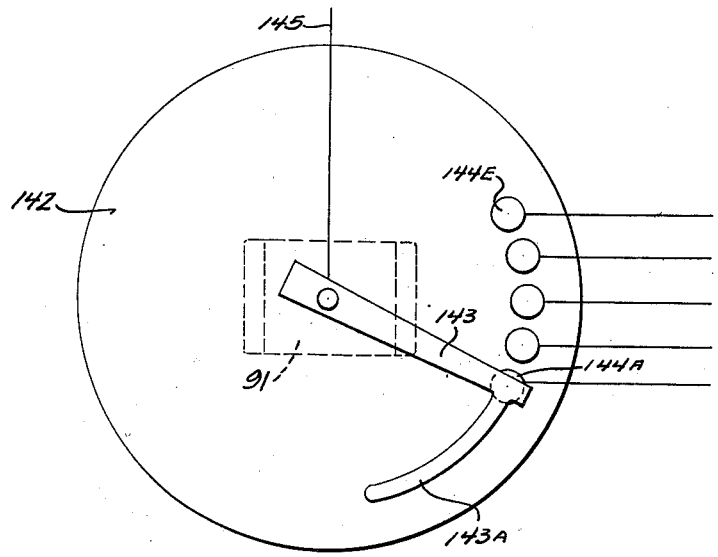
Fig. 3 is a top plan view of an electric switch, and a temperature-responsive element diagrammatically indicated in Fig. 2.
Figure 4:
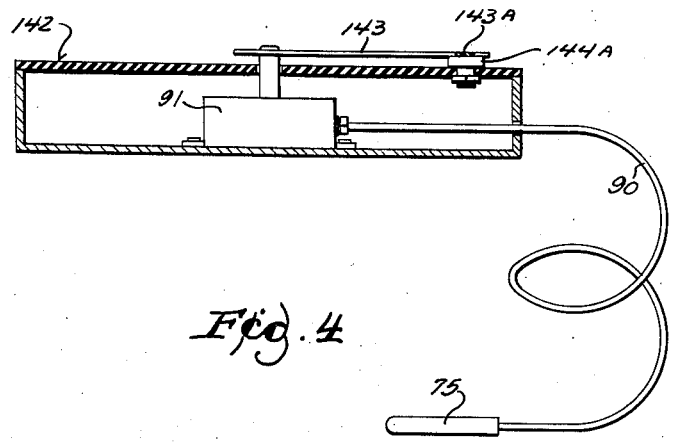
Fig. 4 is a cross-sectional view on a diameter of Fig. 3.

A cabinet 130 contains a voltage regulator 131, a watt-hour meter 132, and a voltmeter 133, the meters being readable from exteriorly of the case and being common to all of the systems A, B, C, D and E. Each system includes an ammeter 136, a rheostat 137 and a signal light 138. Numeral 139 designates a place for recording the selected calibration of the ammeter adjacent thereto, and may consist of a slate, a ground glass or a paper mounted in any suitable fashion.

A temperature-responsive device 142 has a pointer or hand 143 functioning as a switch arm and movable responsive to temperature changes. As the temperature changes in processing, the circuits are successively closed through contacts 144 to activate or energize systems A, B, C, D and E in succession. The temperature responsive device and its switch arm may be of one of the devices known, for closing and opening circuits successively during change in temperature.

The temperature-responsive means is herein illustrated as comprising a gas-containing bulb 75 connected by way of a tube 90 with a chamber 91 for action on a vane or the like on the pivot for the switch arm 143 whereby expansion of gas in the bulb 75 causes rotation of the switch arm as the temperature about the bulb rises. The switch hand 143a passes successively over contacts 144A to 144E to close the electric circuits of systems A to E. The switch hand 143a keeps all of the circuits closed so that a cumulative effect is obtained as described below as the circuits are successively closed due to the rise in temperature in the reaction zone. Such temperature-responsive means are generally well known in the art and no claim is made for any structure relating thereto.

As shown in Fig. 2, an electric power supply line 146 is connected to a voltage regulator 131 to maintain a substantially constant voltage for the control equipment. Conductor 147 from the voltage regulator is connected to one terminal of the voltage component of a watt-hour meter 132 and also to one terminal of a voltmeter 133, and then to a contact 145 of the temperature-responsive device, all of which are grounded.

It will be seen that capacitors 151 are severally connected between contacts 144 and the one terminal of voltmeter 133 to minimize arcing and surge currents.

When the device 142 is at its lowest temperature position, pointer 143 engages contact 144a to complete a circuit from line 147 through device 142 and its contact 144A, with ammeter 136A and electric power flows through rheostat 137A and from thence by way of a return conductor 148 to watt-hour meter 132. From the watt-hour meter, the current flows back through the voltage regulator and out again to power supply line 146. Current supplied to the system A also passes through signal light 138A and from thence through a second return conductor 149 to the power supply 146. Systems B, C, D and E each operate as above described and description of the above circuits need not be repeated. The watt-hour meter integrates the electric currents which flow through the various circuits dependent upon temperature changes acting through the temperature sensitive device 142—145.

The return lead of voltmeter 133 and the return leads from watt-hour meter 132 are part of return conductor 148. The watt-hour meter and the voltmeter are thus connected across only those systems which are actually operating, and do not measure the power passing through the lights.

The calibration figure for the ammeter of each system is inserted on its respective calibration record plate 139.

A method or manner of using the device is set forth by the following examples.

EXAMPLE 1

In use of the present device, the temperature-sensing elements of the temperature-responsive device are placed in the kettle or other device in which a reaction is to be controlled and the apparatus is connected as above described and power is then supplied thereto. The first time the temperature-sensing device is used, a standard mercury thermometer is placed in the thermometer well of a kettle with the temperature-sensing elements and the temperature of the kettle contents is very slowly raised. Assume that operating temperature of the reaction is normally held at 150° C., as when phenylating peri acid (1:8 naphthalamine sulfonic acid) with aniline. When phenylating peri acid, it is found that no measurable reaction takes place below a temperature of 110° C. which is the threshold temperature for this reaction. The temperature coefficient of the rate of reaction is such that the rate doubles with each 10° C. rise in temperature.

The correct settings for the several systems and for any reaction, can be readily computed by use of the following expression:

$$A2^{\frac{°C.-t}{B}}$$ Mathematical Expression 1 where $\frac{°C.-t}{B}$ is the exponent of 2 and $A$ = an arbitrary multiplier introduced to give a practical range of readings on the milliammeter. In the case of Example 1 let $A=5$ $B$ = the number of ° C. within which the rate of reaction doubles itself. In the case of Example 1 the phenylation rate doubles itself about every 10° C.

°C.=the temperature for which it is desired to calculate the milliamperes to be shown by the corresponding milliammeter t=threshold temperature for the reaction in question which in the case of Example 1 is about 110° C.

Using mathematical Expression 1 with the values given below for A, B, and t, the result at 5° intervals between 140° C. and 160° C. is shown in the following tabulation:

*Table I*

$A=5 \quad B=10°\,C. \quad t=110°\,C.$

| ° C. | Total reqd. Milliamperes | Milliammeter should read | System |
|---|---|---|---|
| 140 | 40.00 | 40.00 | A |
| 145 | 56.6 | 16.60 | B |
| 150 | 80.00 | 23.40 | C |
| 155 | 113.1 | 33.1 | D |
| 160 | 160.00 | 46.9 | E |

The milliameter A should therefore show 40.0 milliamperes and this figure should be marked on calibration record plate for that meter. Likewise at 145° C., the total milliamperes shown by milliammeters A and B should total 56.6 milliamperes. The value 56.6 is obtained by multiplying the total milliamperes required at 140° C. by the square root 2. The increase of 16.6 is subtracted from the total increase between 140° C. and 150° C. (range for doubling the rate of reaction) and the difference is 23.4 milliamperes. In like manner, the value 113.1 at 155° C. is obtained by multiplying 80 which is the number of milliamperes required at 150° C., by the square root of 2. Milliammeter A already is set by the rheostat to 40 milliamperes and only the difference between 56.6 and 40.0 or 16.6 milliamperes should be shown by milliammeter B. The rheostat B is adjusted until 16.6 milliamperes is shown on milliammeter B. The value 16.6 is then marked on calibration record plate for milliammeter B. At 150° C., the calculated total is 80 milliamperes and the difference between 56.6 and 80 is 23.4 which is the number of milliamperes to be shown by the milliameter C, after adjusting its rheostat. The figure 23.4 is then marked on calibration record plate for milliammeter C. The tabulated values for systems D and E are also obtained by the above methods.

EXAMPLE 2

In the caustic soda fusion of sodium benzene sulfonate to produce phenol, the rate of reaction doubles about every 5° C. The threshold temperature approximates 300° C. and a good operating temperature approximates 320° C. The set points of the temperature-sensing device should be such that system A begins to function at 315° C., system B begins at 317.5° C., system C begins at 320° C., system D begins at 322.5° C., and system E begins at a temperature of 325° C.

In this example, the values for mathematical expression 1 are:

$A=5 \quad B=25°\,C. \quad t=300°\,C.$ and Table II is obtained where ma.=milliamperes.

*Table II*

| System | Temperature, °C. | Total ma. To Be Shown | Ma. on milliammeter |
|---|---|---|---|
| A | 315 | 40.0 | 40.0 |
| B | 317.5 | 56.6 | 16.6 |
| C | 320.0 | 80.0 | 23.4 |
| D | 322.5 | 113.1 | 33.1 |
| E | 325.0 | 160.0 | 46.9 |

EXAMPLE 3

In the disulfonation of benzene monosulfonic acid as when manufacturing resorcinol, the rate of reaction doubles approximately every 7.5° C. rise in temperature. The threshold temperature approximates 155° C. and a good operating temperature is 200° C. System A should start functioning at 192.5° C., system B should start at 196.25° C., system C should start at 200° C., system D should start at 203.75° C., and system E should start at 207.5° C.

In this case the values of mathematical expression 1 become:

$A=1 \quad B=7.5 \quad t=155$ and Table III is obtained.

*Table III*

| System | Temperature, °C. | Total ma. Required | Ma. on milliammeter |
|---|---|---|---|
| A | 192.5 | 32.0 | 32.0 |
| B | 196.25 | 45.2 | 13.2 |
| C | 200.00 | 64.0 | 18.8 |
| D | 203.75 | 90.5 | 26.5 |
| E | 207.5 | 128.0 | 37.5 |

The figures in the last column of Table III are the figures to be inserted on the several calibration record plates.

Application of this invention to an already going plant process is readily made as follows:

Insert into a thermometer well in the kettle or other device within which the reaction is to be controlled, any one of the temperature-sensing devices known to the art. Adjust the temperature-sensing device to start system C when the temperature reaches a normal or average processing temperature. Adjust the temperature-sensing device to start system A at a temperature where the rate of reaction is one-half that for starting system C. Adjust the temperature-sensing device to start system B at a temperature midway between the temperatures for systems A and C. Adjust the temperature-sensing device to start system E at a temperature where the rate of reaction is double the rate of reaction at the temperature for starting system C. Adjust the temperature-sensing device to start system D at a temperature midway between the temperatures at which systems C and E start.

The span of temperature between A and C and between C and E will have to be estimated from a general knowledge of the type of reaction. That is, a rough approximation of the temperature rise required to double the rate of reaction, will have to be made or such rise must be determined in the laboratory. If it is possible to hold the temperature of the reaction in the kettle within reasonable limits, it is not important that an accurate determination of the temperature span for doubling the rate of reaction to be known to obtain good and beneficial results.

After the above indicated adjustments have been made, using a standard thermometer, a thermocouple, or other temperature measuring devices as a basis of adjustment, carry on the processing for a number of batches in the usual manner. After a number of batches have been run, a correlation can be made between optimum yield and quality of product and the corresponding T–T units registered on the watt-hour meter. The thus determined number of T—T units is an optimum operating control value and the reaction should thereafter be terminated when the said number of T–T units have been registered regardless of the length of time the batch has been processed. Successive batches will thus be processed to precisely the same extent, and over-processing and under-processing, low yield, and inferior quality of product will be avoided. Obviously, the larger the number of systems employed and the shorter the temperature intervals between which successive systems begin functioning, the more accurate and the more useful the results will be.

This application is a division of my co-pending application S. N. 303,779, filed August 11, 1952, now Patent 2,758,475, issued to me August 14, 1956.

I claim:

1. In apparatus for controlling chemical reactions accompanied by temperatures varying with changes in the rate of reaction, the combination of electric switching means continuously responsive to temperature change in the reaction and having a portion moving to different positions corresponding to steps of the same number of degrees of change in the reaction temperature, a source of electric current of constant voltage, a plurality of ammeters successively and cumulatively energized from the current source upon movement of the temperature responsive switching means to different positions for connecting the power source with the ammeters, means for adjusting current flow in the individual ammeter circuits in correspondence to changes of a predetermined proportion of current per temperature step, and means totalizing the current flow through and the time of operation of the several ammeters.

2. In apparatus for controlling chemical reactions accompanied by temperatures varying with changes in the rate of reaction, the combination of electric switching means continuously responsive to temperature change in the reaction as the rate of reaction varies and having a portion moving to successive positions corresponding to the steps of the same number of degrees of change in the reaction temperature, a source of electric current of constant voltage, a plurality of ammeters successively and cumulatively energized from the current source upon movement of the temperature responsive switch means to successive positions for connecting the power source with the ammeters, means for adjusting current flow in the individual ammeter circuits by corresponding increases of current of predetermined proportion per temperature steps, and means integrating the current flow through the energized ammeters with the time of operation thereof.

3. In apparatus for controlling chemical reactions accompanied by temperatures varying with changes in the rate of reaction, the combination of a source of electric current of constant voltage, a plurality of ammeters severally connectible with the current source, electric switching means continuously responsive to temperature changes as the rate of reaction changes and having a portion moving to successive positions corresponding to steps of the same number of degrees of reaction temperature change for successively and cumulatively connecting the ammeters with the source of electric current, means for adjusting current flow in the individual ammeter circuits per corresponding temperature step to a given exponential relation between current and temperature, and a watt-hour meter connected with and integrating the current flow through the several said ammeters with respect to the times of duration of such current flow.

4. In apparatus for controlling chemical reactions accompanied by temperatures varying with changes in the rate of reaction, the combination of a source of electric current of constant voltage, a plurality of ammeters severally connectible with the current source, electric switching means continuously responsive to temperature changes as the rate of reaction changes and having a portion moving to successive positions corresponding to steps of the same number of degrees of reaction temperature change for successively and cumulatively connecting the ammeters with the source of electric current, adjustable rheostats severally connected with the ammeters for controlling the rate of current flow through the ammeters dependent on the temperature coefficient of the reaction whereby the current flow through the ammeter is progressively adjustable to give a cumulative indication of such flow, and a watt-hour meter connected with and integrating the current flow through the several said ammeters with respect to the times of duration of such current flow.

5. In apparatus for controlling chemical reactions accompanied by temperatures varying with changes in the rate of reaction, the combination of a source of electric current of constant voltage, a plurality of ammeters severally connectible with the current source, electric switching means continuously responsive to temperature changes resulting from change in the rate of reaction and having a portion moving to successive positions corresponding to steps of the same number of degrees of reaction temperature change for successively and cumulatively connecting the ammeters with the source of electric current, means for adjusting current flow in the individual ammeter circuits by a constant exponentially related increase of current per corresponding temperature step, and a watt-hour meter connected with and integrating the electric current flowing through the several said ammeters with the time of such flow.

6. In apparatus for controlling chemical reactions accompanied by temperatures varying with changes in the rate of reaction, the combination of a source of electric current of constant voltage, a plurality of ammeters severally connectible with the current source, electric switching means continuously responsive to temperature changes resulting from change in the rate of reaction and having a portion moving to successive positions corresponding to steps of the same number of degrees of reaction temperature change for successively and cumulatively connecting the ammeters with the source of electric current, signals severally in circuit with the ammeters for indicating the successive energization thereof, means for adjusting current flow in the individual ammeter circuits in the relation of a corresponding increase of the square root of 2 in the current per temperature step, and a watt-hour meter connected with and integrating the current flow through the several said ammeters with respect to the times of duration of such current flow.

References Cited in the file of this patent

UNITED STATES PATENTS 2,505,521     Boyajian _____ Apr. 25, 1940